US005191644A

United States Patent [19]

Takeda

[11] Patent Number: 5,191,644

[45] Date of Patent: Mar. 2, 1993

[54] MULTIWINDOW CONTROL SYSTEM

[75] Inventor: Masaru Takeda, Saitama, Japan

[73] Assignee: Fuji Xerox Co., Ltd., Tokyo, Japan

[21] Appl. No.: 594,963

[22] Filed: Oct. 10, 1990

[51] Int. Cl.[5] .............................. G06F 15/20

[52] U.S. Cl. .............................. 395/158; 395/157; 395/155; 340/717; 340/750

[58] Field of Search .............................. 395/157, 158, 155; 340/747, 750, 717

[56] References Cited

U.S. PATENT DOCUMENTS

| | | | |
|---|---|---|---|
| 4,953,106 | 8/1990 | Gansner et al. | 364/521 |
| 5,119,475 | 6/1992 | Smith et al. | 395/156 |
| 5,129,052 | 7/1992 | Barker et al. | 395/148 |

*Primary Examiner*—Gary V. Harkcom

*Assistant Examiner*—Phu K. Nguyen

*Attorney, Agent, or Firm*—Finnegan, Henderson, Farabow, Garrett and Dunner

[57] ABSTRACT

A multiwindow control system in which, if an examination window overlaps a display area of a detecting window and has the same parent as the detecting window, the system divides the display area of the detecting window by an extension of the overlapping side of the examination window and changes the divided display areas into new detecting areas. After the portions of detecting areas which overlap with individual examination windows are successively divided, the remaining new detecting areas become areas of the original detecting window in which image information can be displayed.

3 Claims, 6 Drawing Sheets

MULTIWINDOW CONTROL SYSTEM

BACKGROUND OF THE INVENTION

1. Field of the Invention

This invention relates to a multiwindow control system for use in information processing apparatus, such as workstations and computers, that are capable of displaying image information in multiple windows on a display screen. More particularly, this invention relates to a multiwindow control system for controlling displays having a plurality of windows that overlap with one another.

2. Discussion of the Related Art

With the expansion of use of information processing apparatus, such as workstations, the use of multiwindow systems in these apparatus has become common. The term "multiwindow system" means a system that is designed to display a plurality of windows on the same display screen. Using a multiwindow system is greatly advantageous because plural types of processing can be executed in the respective windows on the same screen and images can be copied using the plurality of windows.

One or more window systems may be used to display a plurality of windows on the display screen. If a single window system is used, a plurality of windows are displayed by one processing program. When more than one window system is used, a plurality of processing programs are responsible for displaying their own windows.

FIG. 11 shows an example of a window display in a multiwindow system. Display screen 11 shows windows 12A and 12B that are displayed by a first window system and windows 13A and 13B that are displayed by a second window system. Window 12A, which is the same size as the outside dimensions of screen 11, should serve as a parent when parentage is established by the first window system. This window is usually referred to as a "root" window. Assuming that a child window always exists within a parent, window 12B, which is displayed by the first window system, is a child of window 12A.

Windows 13A and 13B are established by the second window system within window 12B. The first and second window systems are different, and therefore, different capabilities of processing are usually performed depending upon whether a cursor (not shown) is located in the inside or outside of a window in the second window system. Windows 13A and 13B displayed by the second window system have no parentage since neither contains the other.

There is an overlap between windows in FIG. 11. Such an overlap between windows will frequently occur even in the same window system. This is shown in FIG. 12. Display screen 21 shows first window 22A which is overlaid with second window 22B and third window 22C. As far as first window 22A is concerned, the window contents are only displayed in two notched rectangular areas 23 and 24. The other areas are covered by either second window 22B or third window 22C, and no contents are displayed.

As will be readily understood from the foregoing description, the area of a window displayed by a multiwindow system but covered with another window cannot be seen. Of course, the covered area will become visible if the overlay window is either moved to another location, closed or reduced in size. Various techniques have been developed in the prior art to render the covered area visible. The uncovered area, which has become visible, can contain associated image information to be displayed on the screen.

On the other hand, the contents of the area of windows which remain visible despite overlapping are generally displayed by a displaying means provided by the window system. However, it is necessary to directly write image information in a display memory when high speed displaying. If the image information is written over the visible area, however, the image information in the visible area overflows and becomes incomplete.

In a multiwindow system, first and second window systems simultaneously write the image information into the display memory corresponding to the visible image area, thus causing overlapping portions. Additionally, an order of the overlapping is not fixed because display requests occur asynchronously according to the programs using the window systems. Accordingly, the contents of the display are varied corresponding to the order of the display requests.

In order to eliminate this problem, a display section of the second window system may be modified so that the means for writing the image information into the display memory actually utilizes the means provided by the first window system. Under these circumstances, however, processing by the display section of the second window system and processing by the first window system are executed simultaneously. Thus, a considerable amount of time is required for display control.

SUMMARY OF THE INVENTION

The present invention has been made in view of the above circumstances and has as an object providing a multiwindow control system that is capable of rapidly displaying those areas of overlapping windows which contain visible image information.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the multiwindow control system of this invention comprises a detecting area window setting means for setting, on a display screen, an area of a detecting window as a display area where image information is to be displayed, an examination window setting means for setting a single window as an examination window, the examination window being different than the detecting window and being located on the display screen, a parentage checking means for checking whether the examination window is a child window having a common parent with the detecting window, an overlap checking means for checking whether the examination window, which has been found to be a child window by the parentage checking means, overlaps the display area of the detecting window, a detecting window changing means for dividing the display area of the detecting window by an overlapping side or an extension thereof of the examination window, and for changing the divided display areas of the detecting window into new detecting windows, the new detecting windows being checked for parentage by the parentage checking means, an examination window changing means for changing a window located on the display screen, other than the detecting window, to a changed examination window when the examination window is found by the parentage checking means not to be a child window, the changed examination window being checked for parentage by the parentage checking means, and a display-adapted area setting means for setting the new detecting windows into display-adapted areas when no windows except new detecting windows exist on the display screen.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

In accordance with an embodiment of the invention, if an examination window overlaps a detecting window having a display area and the examination window has the same parent as the detecting window, the display area of the detecting window is divided by an extension of the examination window's overlapping side. Each of the display areas of the detecting window, to which the examination window does not belong after the division, is changed to a new detecting window. After the portions of detecting areas which overlap with individual examination windows are successively exclude, the remaining one or more portions of the detecting window become areas of the initial detecting window where image information can be displayed. With display-adapted areas being thus specified, the need for overwriting image information is eliminated and rapid display of those areas where image information is visible can be accomplished.

If the display screen consists of an image information display window and one or more accessory windows, which are located adjacent the image information display window so as to display the title and other information of a document that is displayed within the image information display window, the image information display window and accessory windows are checked for parentage as a unit in order to enable the detection of display areas. Thus, display areas can be detected even in a multiwindow system that provides a window, a part of which is not used to display image information.

If a plurality of window systems are used, one of which is a master and the others are slaves (a term of display control) a window displayed by the master window system is operationally assumed to have parentage with one or more windows that are displayed by a slave window system. Thus, display areas can be detected even in a multiwindow system comprising different window systems.

The multiwindow control system further includes a position change detecting means for detecting a change in the position of a window displayed on the display screen, and an examination starting means which, when the change in position is detected, allows the examination window setting means to set an examination window. Thus, practical applications of display control is provided by detecting a display area each time the change in the position of a window on the display screen is detected.

Figure 1:
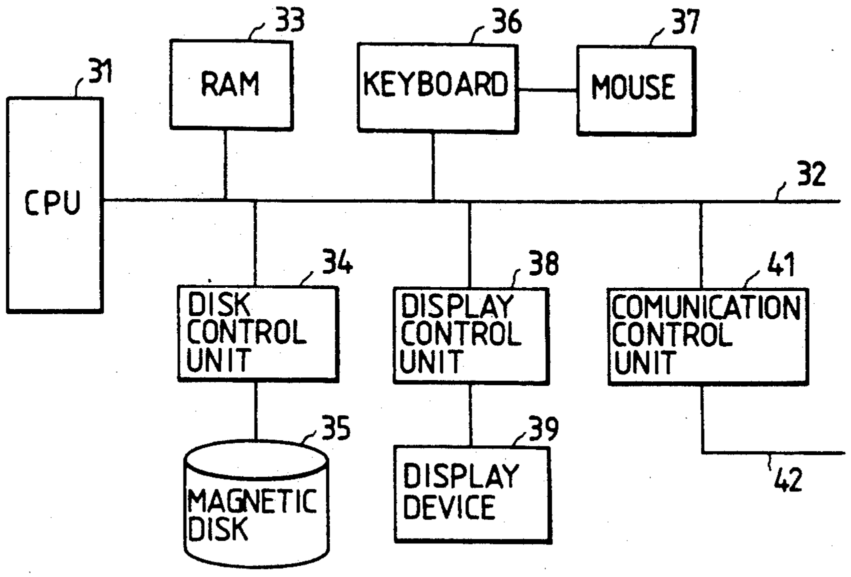
FIG. 1 is a schematic block diagram of the circuit configuration of a multiwindow control system according to an embodiment of the present invention.

A preferred embodiment of the present invention will be described with reference to FIG. 1. FIG. 1 is a schematic block diagram of the construction of a multiwindow control system. The multiwindow control system has CPU (central processing unit) 31 which is connected to various circuit devices via bus 32. Bus 32 is a data bus, for example. Among the various circuit devices connected to CPU 31 are RAM (main memory) 33 which is a random access memory for temporarily storing programs and various kinds of data, disk control unit 34 which is connected to magnetic disk 35 for performing various operations such as reading the program stored in disk 35 and writing a prepared document into disk 35 (magnetic disk 35 may be replaced by other suitable external memory devices), keyboard 36 from which data is entered and which may be connected to pointing device mouse 37, display control unit 38 which has a built-in screen memory (not shown) and is adapted to control display device 39, such as a CRT, and communications control unit 41 which may be connected via cable 42 to workstations, printers and other machines in a local area network to permit the necessary data to be entered into or delivered from these machines.

Figure 2:
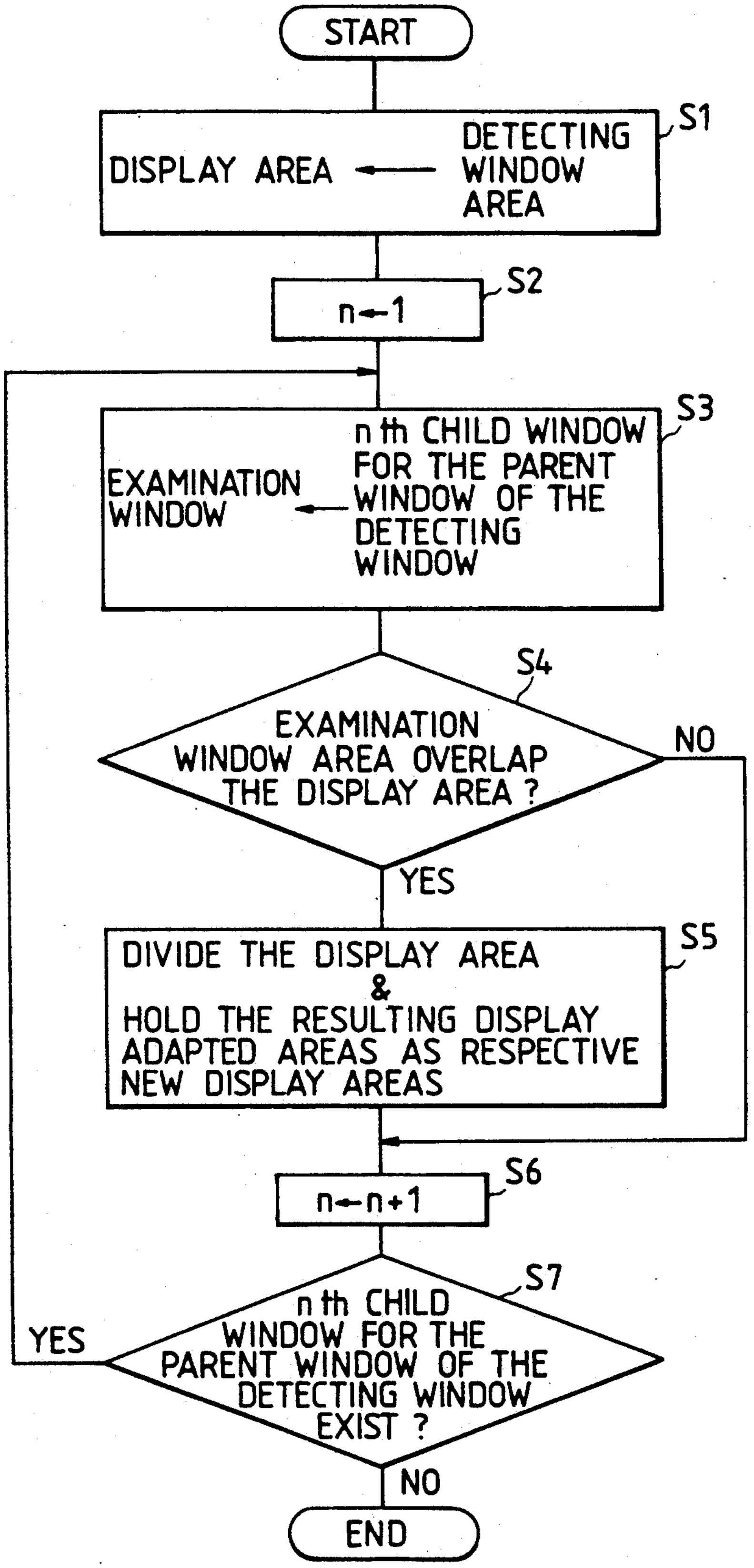
FIG. 2 is a flowchart showing the sequence of control steps for determining display-adapted areas.
Figure 12:
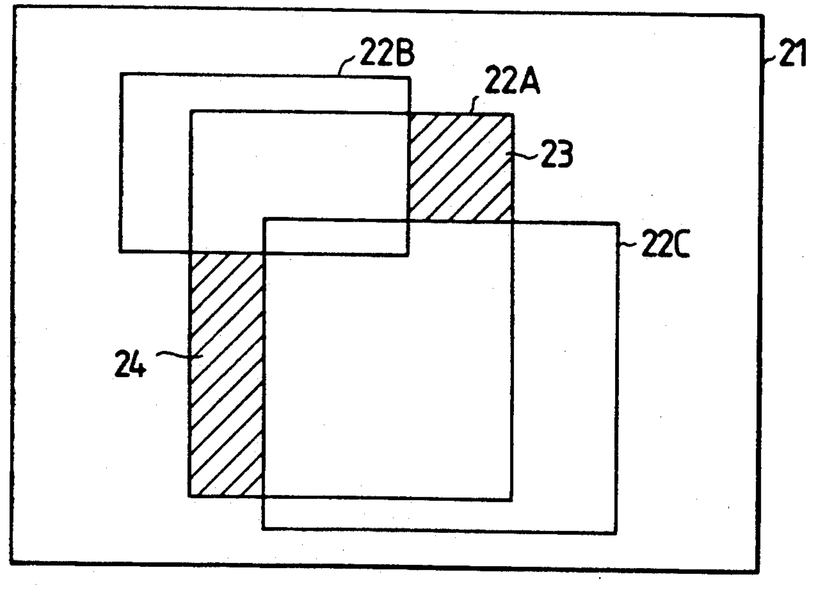
FIG. 12 is a diagram illustrating how a plurality of overlapping windows are displayed.

FIG. 2 shows the flow of control steps for determining display-adapted areas of the type shown in FIG. 12 using a multiwindow control system having the construction described above. For the sake of simplicity, it is assumed that the multiwindow control system in this preferred embodiment uses a single window system to display a plurality of windows. It is also assumed that if the windows appear on the screen individually (i.e., without overlap), image information can be displayed in the entire area of each window.

The windows to be displayed on display device 39 in the multiwindow control system under discussion will be located as shown in FIG. 12. Thus, first window 22A is a window for detecting the area where image information is to be displayed. Window 22A is hereinafter referred to as a "detecting window". As shown in FIG. 12, detecting window 22A is partly covered with second and third windows 22B and 22C. Two uncovered rectangular areas 23 and 24 will be the areas of interest where image information is to be displayed.

Figure 3:
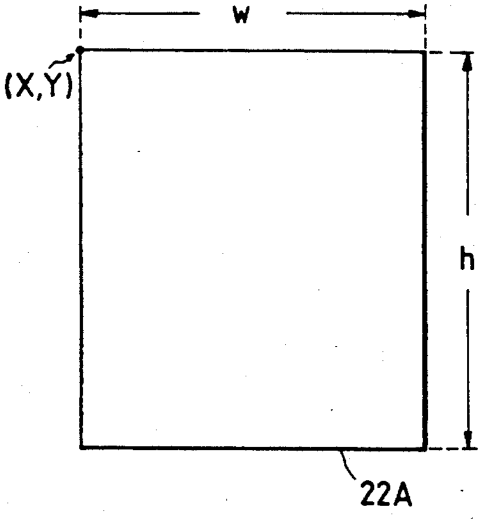
FIG. 3 is a plan view showing the entire area of an illustrative detecting window.

First, CPU 31 in FIG. 1 sets the entire area of detecting window 22A as a detecting area for detecting where image information is to be displayed (step 1 in FIG. 2). FIG. 3 illustrates the entire area of detecting window 22A. The upper left corner of this window has coordinates (X, Y), the sides parallel to the X-axis have a length of "w" and the sides parallel to the Y-axis have a length of "h". If the origin (0, 0) is at the lower left corner of window 22A, the display-adapted area will be the rectangle having the diagonal line terminated by the two points (0, 0) and (w, h).

Turning back to FIG. 2, after the entire area of the detecting window 22A is set in step 1 as a display area, CPU 31 initializes the numerical value "n" stored in a predetermined area of RAM 33 to "1" (step 2). Subsequently, a first child window, with respect to the parent window of detecting window 22A, is set as an examination window (step 3).

Figure 4:
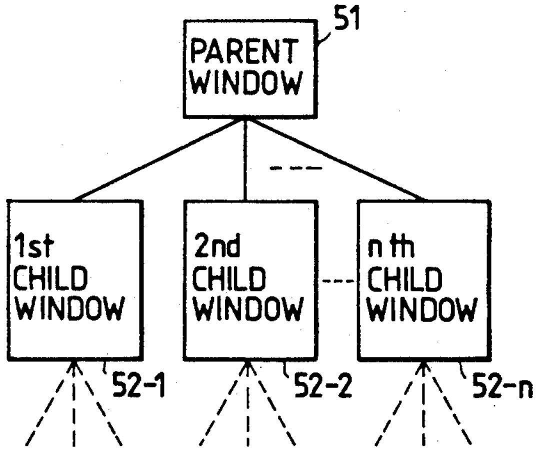
FIG. 4 illustrates the general parentage of windows.

FIG. 4 illustrates the general parentage of windows. A single window system has a tree structure that consists of parent window 51, below which the first to the nth child windows 52-1 to 52-*n* exist. Grandchild windows exist below each of child windows 52-1 to 52-2 (not shown). The window ranking in the highest order is a "root window" which, as already described, is delineated by the whole area of the display screen. None of the rectangular areas of the child windows having the parentage contemplated by the present invention should go beyond the rectangular area of the parent window.

If first child window 52-1 is selected as an examination window, CPU 31 checks as to whether the area of this examination window overlaps the aforementioned display area (step 4). This may be accomplished by numerical comparison to examine whether at least one of the four corners, as represented by coordinates, of the first child window 52-1 is included within the area of detecting window 22A.

Referring to FIG. 12, the current examination window (second window) 22B overlaps detecting window 22A. In this case (Y in step 4), the display area is divided and, as a result, several display-adapted areas are set as new display areas (step 5).

Figure 5:
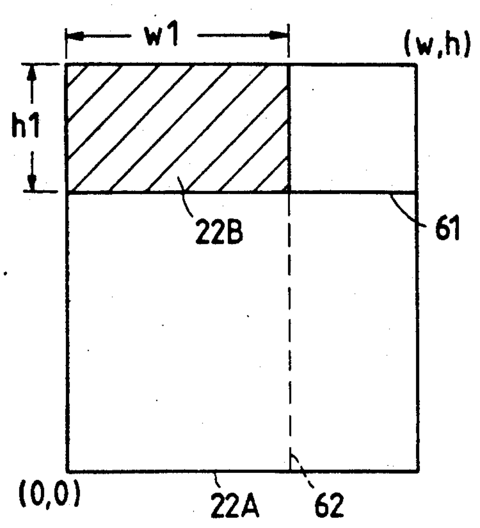
FIG. 5 illustrates an examination window that partly overlaps a detecting window.

FIG. 5 illustrates how the display area is changed in step 5. The upper left portion of detecting window 22A is overlaid with the hatched examination window 22B. The display are is divided by line 61 which is the extension of the bottom side of examination window 22B. The display area may also be divided by line 62 which is the extension of the right side of examination window 22B. If desired, both extensions 61 and 62 may be used to divide the display area into smaller segments.

As a result of this division, several display-adapted areas are set as new display areas. Suppose that the display area is divided by extension 61, as shown in FIG. 5, and that the part of detecting window 22A overlaid with examination window 22B has a length of "w1" in the X-axis direction and a length of "h1" in the Y-axis direction. The following two areas then are set as new display areas:

-continued

| | |
|---|---|
| First display area: | the rectangular area having the diagonal terminated with the two points (w1, h−h1) and (w, h); and |
| Second display area: | the rectangular area having the diagonal terminated with the two points (0, 0) and (w, h−h1). |

With the new display areas set in the manner described above, the numerical value "n" is increased to "2" by addition of increment "1" as shown in step 6 of FIG. 2. If the examination window does not overlap the display area ("No" in step 4), the control process will not go to step 5 but will directly proceed to step 6.

In step 7, CPU 31 checks for the presence of an nth child window with respect to the parent window of detecting window 22A. In the example under consideration, second child window 22C exists and thus step 7 is "Yes." The process thus proceeds to step 3 and window 22C is set as a new examination window. New examination window 22C overlaps the first or the second display area.

Figure 6:
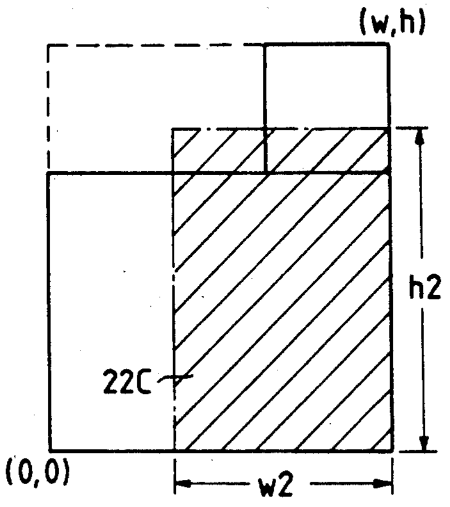
FIG. 6 illustrates another examination window that overlaps the areas that were newly displayed by the overlap of the examination window shown in FIG. 5.

FIG. 6 shows how the examination window 22C covers the new display areas. In FIG. 6, the area occupied by examination window 22C is enclosed with the one-long-and-one-short dashed line and is hatched. Suppose this area has a length of "w2" in the X-axis direction and a length of "h2" in the Y-axis direction. As shown in FIG. 6, examination window 22C overlaps both of the two display areas. Accordingly, each of these display areas is divided, and the resulting display-adapted areas are used as new display areas (step 5).

Figure 7:
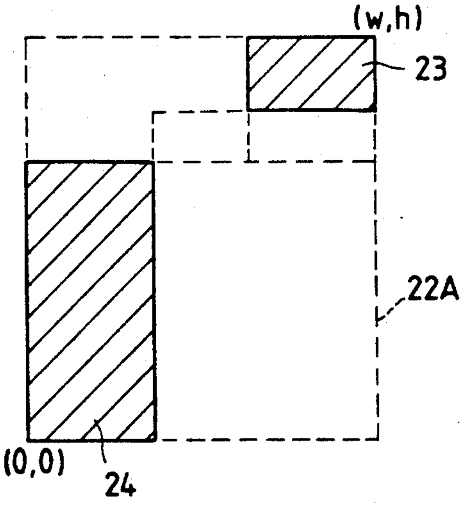
FIG. 7 illustrates the two finally determined new display areas of the examination window shown in FIG. 6.

In FIG. 7, the two new display areas thus obtained are shown as being hatched. They are:

| | |
|---|---|
| first display area: | rectangle 23 having the diagonal terminated with the two points (w1, h2) and (w, h) |
| second display area: | a rectangle 24 having the diagonal terminated with the two points (0, 0) and (w−w2, h−h1) |

After the display areas are divided, the numerical value "n" is increased to "3" by the addition of increment "1" (step b in FIG. 2). No third child window exist and the process of determining display areas ends. Accordingly, the image information which is supposed to be written in the entire area of detecting window 22A is selectively written by CPU 31 into those areas where image information actually can be seen, namely, the two rectangular areas 23 and 24 that are hatched in FIG. 7.

The application of the present invention to different window systems will now be described. If two different window systems are operated simultaneously in a single system, a dominating window system is a master window system having a plurality of slave windows being displayed in a single master window. Each of the slave windows operates as a child with respect to one of the windows displayed by the master window system. Hence, the areas where image information should be displayed can be determined by examining the overlap of master windows each time the positional relationship of those windows changes. Thus, the concept of the present invention is applicable not only when using a single window system but also when using different window systems.

Figure 8:
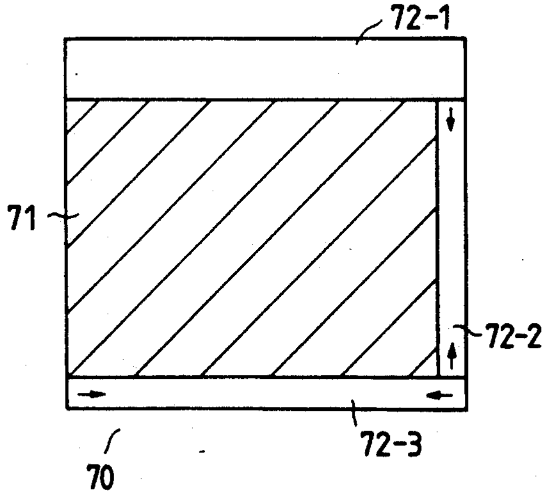
FIG. 8 is a plan view showing an example of the window that consists of an image information display window and three control windows.

The foregoing embodiments assume that the whole area of a displayed window is adapted for displaying image information. In fact, however, many windows have areas of various control subwindows in which image information is not displayed. FIG. 8 shows an example of a window having control subwindows. Image information display window 71 has first control window 72-1 on the top for displaying information such as the title of the application being used, second control window 72-2 on the right side for scrolling image information up or down, and third control window 72-3 on the bottom for scrolling image information to the left or to the right.

Figure 9:
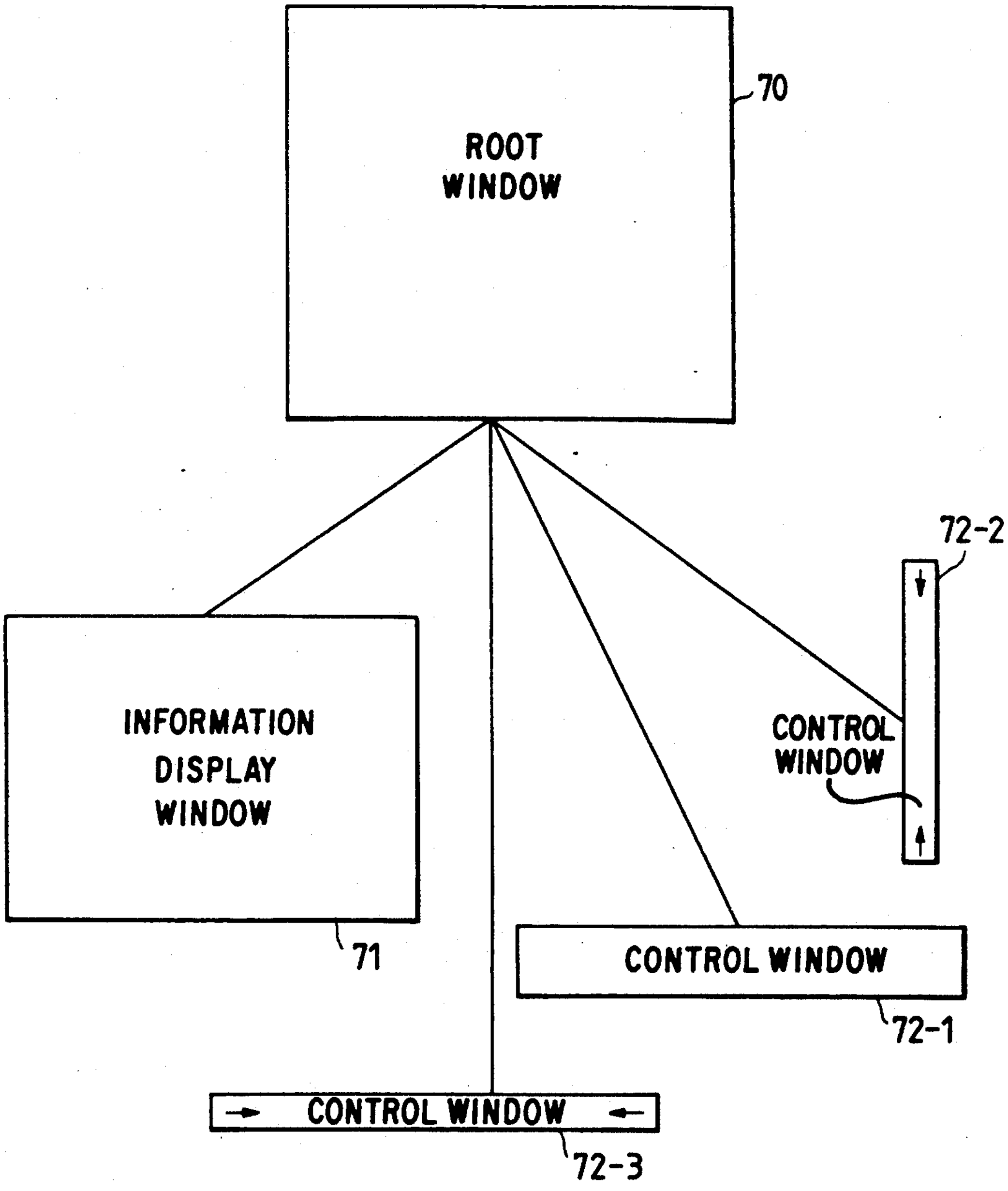
FIG. 9 illustrates the formal parentage of the windows shown in FIG. 8.

FIG. 9 shows the formal parentage of the windows shown in FIG. 8. Image information display window 71 and the three control windows 72-1 to 72-3 are all within the frame of root window 70. Thus, root window 70 is the parent and the other windows 71, and 72-1 to 72-3, are children. Display areas can be specified without making any change to the algorithm used in the present invention by comparing a plurality of windows each consisting of the image information display of window 71 and associated control windows 72-1 to 72-3.

Figure 10:
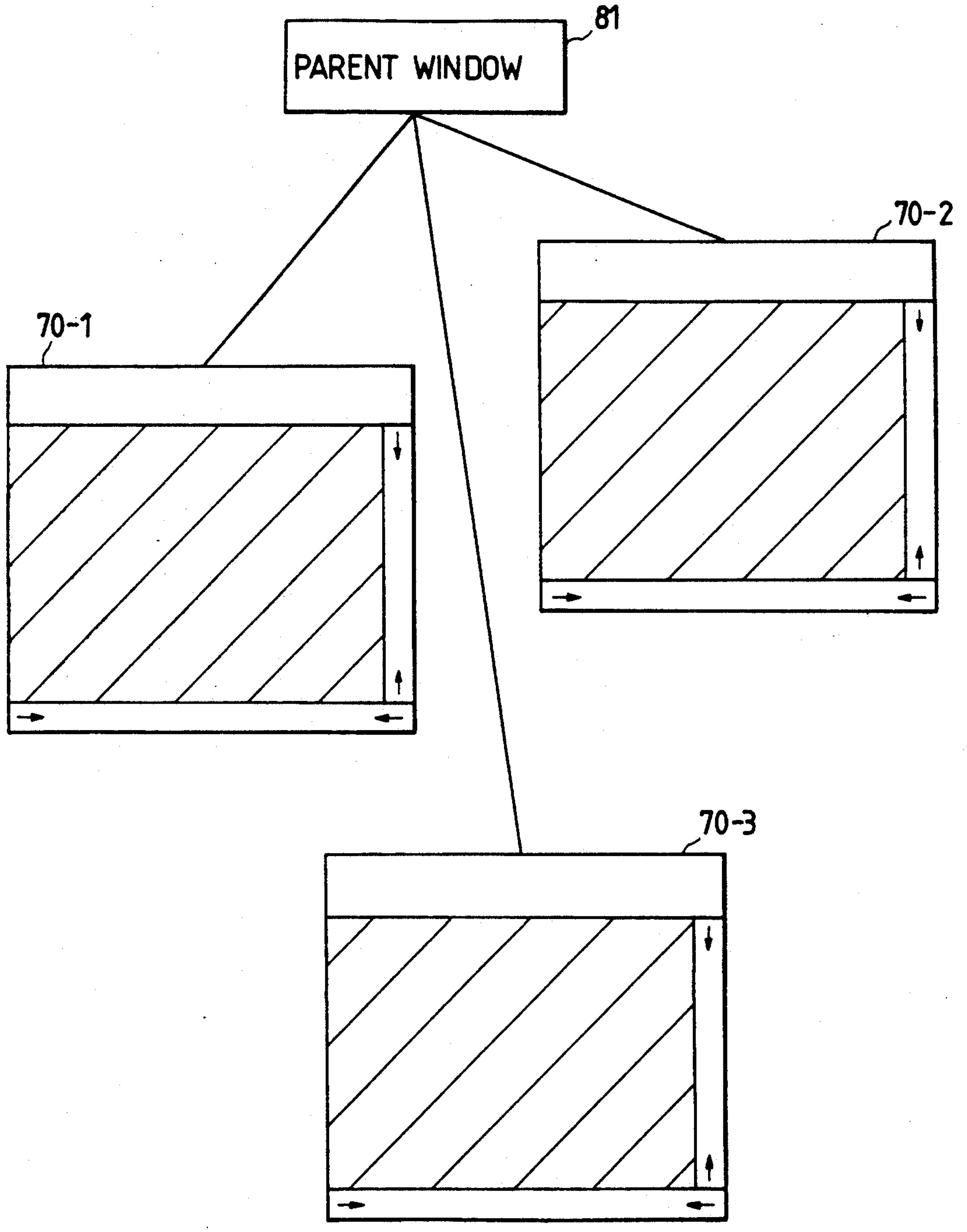
FIG. 10 illustrates the parentage of windows each having the window composition shown in FIG. 8.
Figure 11:
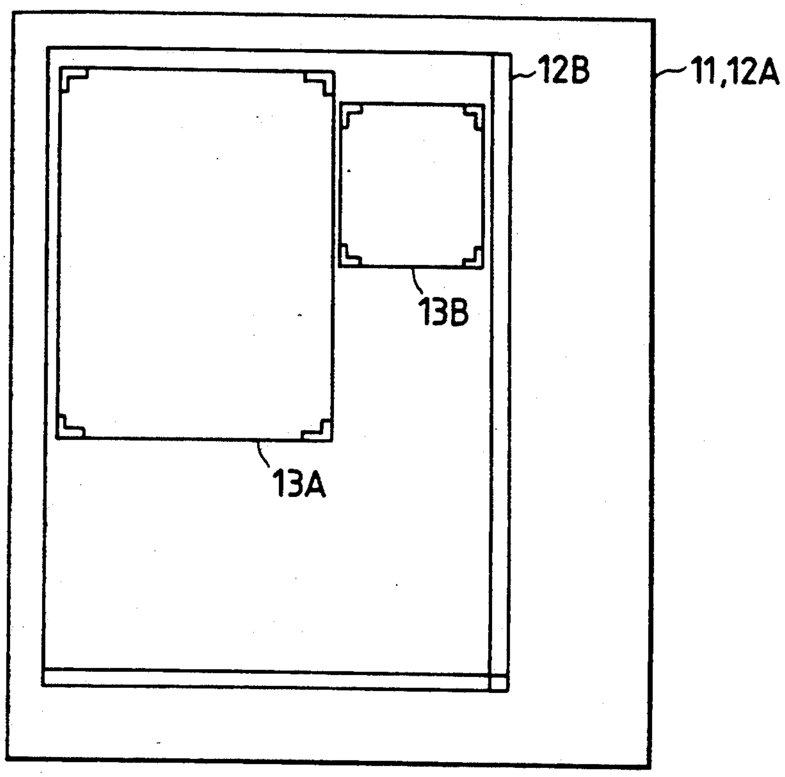
FIG. 11 is a plan view showing an example of the display screen showing windows displayed by different window systems in the prior art.

FIG. 10 shows the parentage of the windows displayed by a window system of the type described above. Each of parent windows 81, having the same window format, has a plurality of associated child windows 70-1 to 70-3 of the format shown in FIGS. 8 and 9. When there is an overlap between these windows, display areas are set according to the principles described above. Image information will eventually be displayed in the area of image information display window 71 (see FIG. 8).

In accordance with the general concept of the present invention, child windows having the same parent are examined for any overlap, the current display area is divided into several portions, and the display-adapted areas are set as new display areas. The new display areas then are examined for any overlap with other similar windows until ultimate display-adapted areas are finally determined. In this way, rectangular areas in which image information is actually displayed can be identified rapidly. Since image information need be displayed only in the identified areas, the present invention has the advantage of shortening the time required to complete the display of image information.

According to the present invention, if one window consists of an image information display window and one or more adjacent accessory windows, the individual windows are checked for parentage using a window that includes the image information display windows and accessory windows as a unit. Display areas can finally be determined by using the same procedure that is used in determining display areas of an image information display window only.

Furthermore, according to the present invention, if different window systems are used, one of the windows displayed by a dominating master window system is assumed to have parentage with one or more of the windows displayed by a slave window system. The display of the slave window system is to be controlled by the master window system and this operational assumption enables final display areas to be detected even in a multiwindow system comprising different window systems.

The multiwindow control system further includes a position change detecting means and an examination starting means which, when the change in the position of a window being displayed on the screen is detected, allows the examination window setting means to a set an examination window. This has the advantage of enhancing the efficiency of display control since a display area is detected each time the change in the position of a window on the screen is detected.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multiwindow control system for controlling displays on an information processor display screen, comprising:

detecting window setting means for setting a detecting window having a selected display area where image information is to be displayed in a first portion of the display screen;

examination window setting means for setting an examination window in a second portion of the display screen;

parentage checking means for checking whether the examination window is a child window having a common parent with the detecting window;

overlap detecting means for detecting whether said examination window overlaps said detecting window at times when said examination window is a child window;

detecting window dividing means for dividing the display area of said detecting window at times when said overlap detecting means detects overlap by said examination window, the divided display areas of the detecting window forming a plurality of detecting windows, said plurality of detecting windows being checked for parentage by said parentage checking means;

examination window changing means for changing said examination window at times when said examination window is found by the parentage checking means not to be a child window, the changed examination window being checked for parentage by said parentage checking means; and display-adapted area setting means for setting said plurality of detecting windows into display-adapted areas of the display screen when no windows except said plurality of detecting windows exist on the display screen.

2. A multiwindow control system according to claim 1, further including:

a position change detecting means for detecting a change in the position of a window displayed on the display screen; and an examination starting means for allowing the examination window setting means to set an examination window when the change in position of a window is detected.

3. A method of displaying image information in multiple windows on a display screen comprising the steps of:

setting, on a display screen, an area of a detecting window as a display area where image information is to be displayed;

setting a single window as an examination window, the examination window being different than the detecting window and being located on the display screen;

checking whether the examination window is a child window having a common parent with the detecting window;

checking whether the examination window, which has been found to be a child window, overlaps the display area of the detecting window;

dividing the display area of the detecting window at times when the examination window overlaps the detecting window;

changing the divided display areas of the detecting window into new detecting windows;

checking the new detecting windows for parentage;

changing the examination window to a changed examination window when the examination window is found not to be a child window;

checking the changed examination window for parentage; and setting the new detecting windows into a display-adapted area when no windows except new detecting windows exist on the display screen.

* * * * *